United States Patent [19]

Kubota et al.

[11] 4,365,522

[45] Dec. 28, 1982

[54] SHIFT LEVER MECHANISM OF AN AUTOMATIC TRANSMISSION

[75] Inventors: Shikibu Kubota, Koganei; Yuichi Uriya, Tokyo, both of Japan

[73] Assignee: Nissan Motor Co., Ltd., Yokohama, Japan

[21] Appl. No.: 218,330

[22] Filed: Dec. 19, 1980

[30] Foreign Application Priority Data

Dec. 21, 1979 [JP]  Japan .......................... 54-178153[U]

[51] Int. Cl.³ .............................................. G05G 5/14
[52] U.S. Cl. ........................................ 74/475; 74/527; 74/538
[58] Field of Search ................. 74/473 R, 475, 527, 74/538

[56] References Cited

U.S. PATENT DOCUMENTS 2,964,964  12/1960  Craig ............................. 74/473 R

FOREIGN PATENT DOCUMENTS 734540   4/1943  Fed. Rep. of Germany .... 74/473 R
2502578  7/1976  Fed. Rep. of Germany .... 74/473 R
417462  11/1910  France .............................. 74/475
53-21359  2/1978  Japan ............................... 74/538
1527165 10/1978  United Kingdom ................ 74/475

Primary Examiner—Allan D. Herrmann
Attorney, Agent, or Firm—Thompson, Birch, Gauthier & Samuels

[57] ABSTRACT

In a shift lever mechanism of a vehicle automatic transmission, there is provided a detent feeling generating mechanism which gives the driver an assured detent feeling upon shifting from "D" position to "2" position or vice versa. The detent feeling generating mechanism comprises a plate member which is stationary relative to the vehicle body and which has a stepped cam surface, a cylindrical rod swingable about its axis in response to the shifting movement of a shift lever relative to the plate member, a tubular housing fixed to the cylindrical rod to be swingable therewith and having a ball rotatably mounted in the free end thereof, and a spring disposed in the tubular housing to bias the ball to project outwardly so that the ball is forced to engage the stepped cam surface of the plate member.

10 Claims, 5 Drawing Figures

SHIFT LEVER MECHANISM OF AN AUTOMATIC TRANSMISSION

BACKGROUND OF THE INVENTION

1. Field of the Invention

The present invention relates in general to an automatic transmission of a motor vehicle, and more particularly to a shift lever mechanism of the automatic transmission.

2. Description of the Prior Art

In a shift lever mechanism of an automatic transmission having "P" (parking) position, "R" (reverse-drive) position, "N" (neutral) position, "D" (forward-drive) position, "2" (second-speed forward-drive) position, and "1" (first-speed forward drive) position, it is usual that the shifting from the "D" position to the "2" position or vice versa is manually made without depressing the push button mounted on the top of the shift lever. In order to give the driver a feeling of security during such shifting, "detent feeling generating mechanisms" have been proposed which function to give the operator "a feeling of detent" when he or she moves the shift lever from the "D" position to the "2" position or vice versa. However, some of such detent feeling generating mechanisms fail to satisfy the user's demands for improved dependability and miniaturization.

BRIEF SUMMARY OF THE INVENTION

It is an object of the present invention to provide a shift lever mechanism which has an improved detent feeling generating mechanism which gives the driver a feeling of security when shifting the lever from one operational position to another operational position.

It is another object of the present invention to provide an improved detent feeling generating mechanism which is constructed to give the driver an assured detent feeling during shifting of the lever.

It is still another object of the present invention to provide an improved detent feeling generating mechanism which is compact in size and inexpensive in production.

According to the present invention, there is provided a shift lever mechanism of a vehicle automatic transmission. The shift lever mechanism comprises first means for selecting one of the operational modes of the automatic transmission, second means for retaining the first means in a certain one of its selected operational modes, a plate member which is stationary relative to the vehicle body, the plate member being formed with a stepped cam surface, a cylindrical rod swingable about its axis in response to operation of the first means relative to the plate member, a tubular housing connected to the cylindrical rod to be swingable therewith about the axis of the cylindrical rod, a ball rotatably mounted on a free end of the tubular housing, and biasing means for biasing the ball to project from the open end of the tubular housing so that the ball is forced to engage the stepped cam surface of the plate member.

BRIEF DESCRIPTION OF THE DRAWINGS

Other objects and advantages of the present invention will become clear from the following description when taken in conjunction with the accompanying drawings, in which.

DETAILED DESCRIPTION OF THE INVENTION

Figure 1:
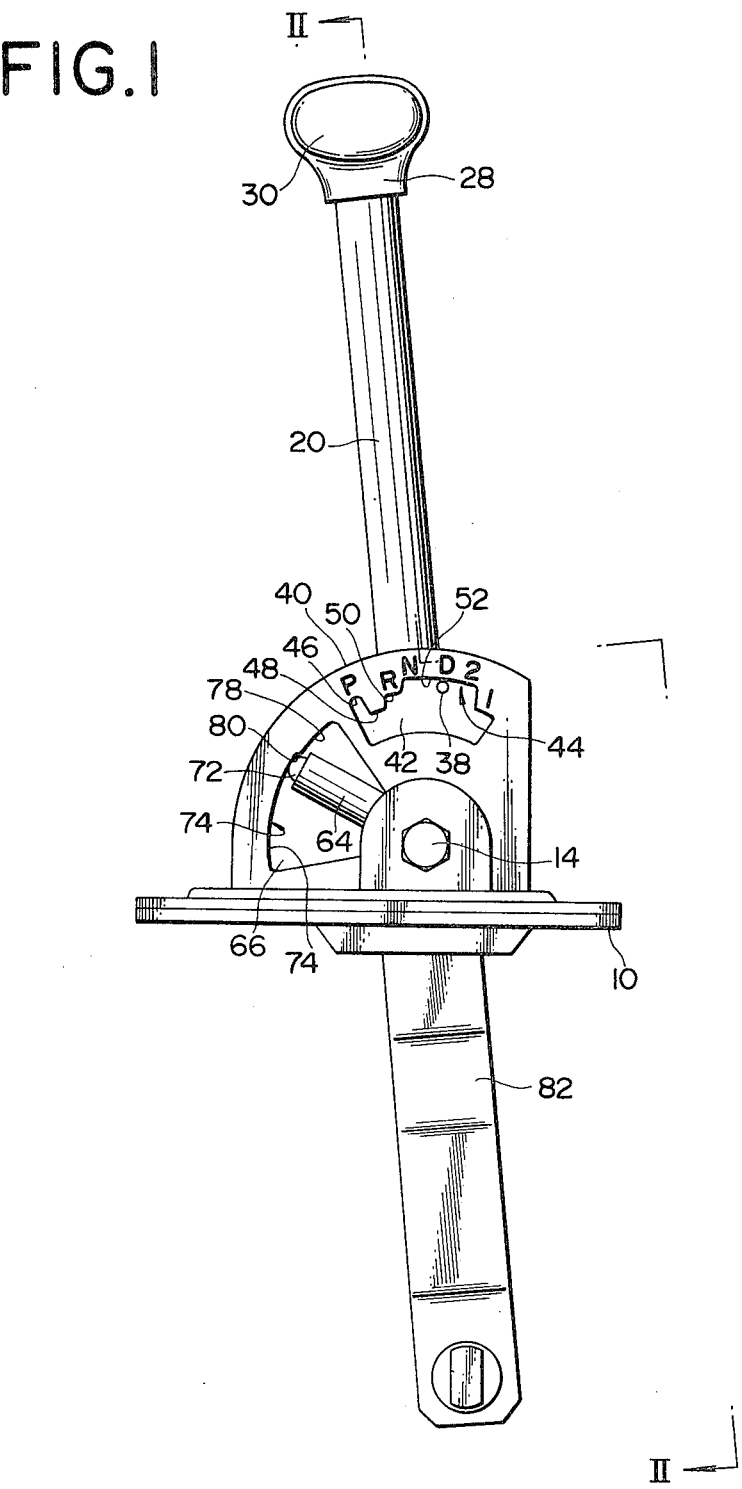
FIG. 1 is a front view of a shift lever mechanism of a first embodiment of the present invention.
Figure 2:
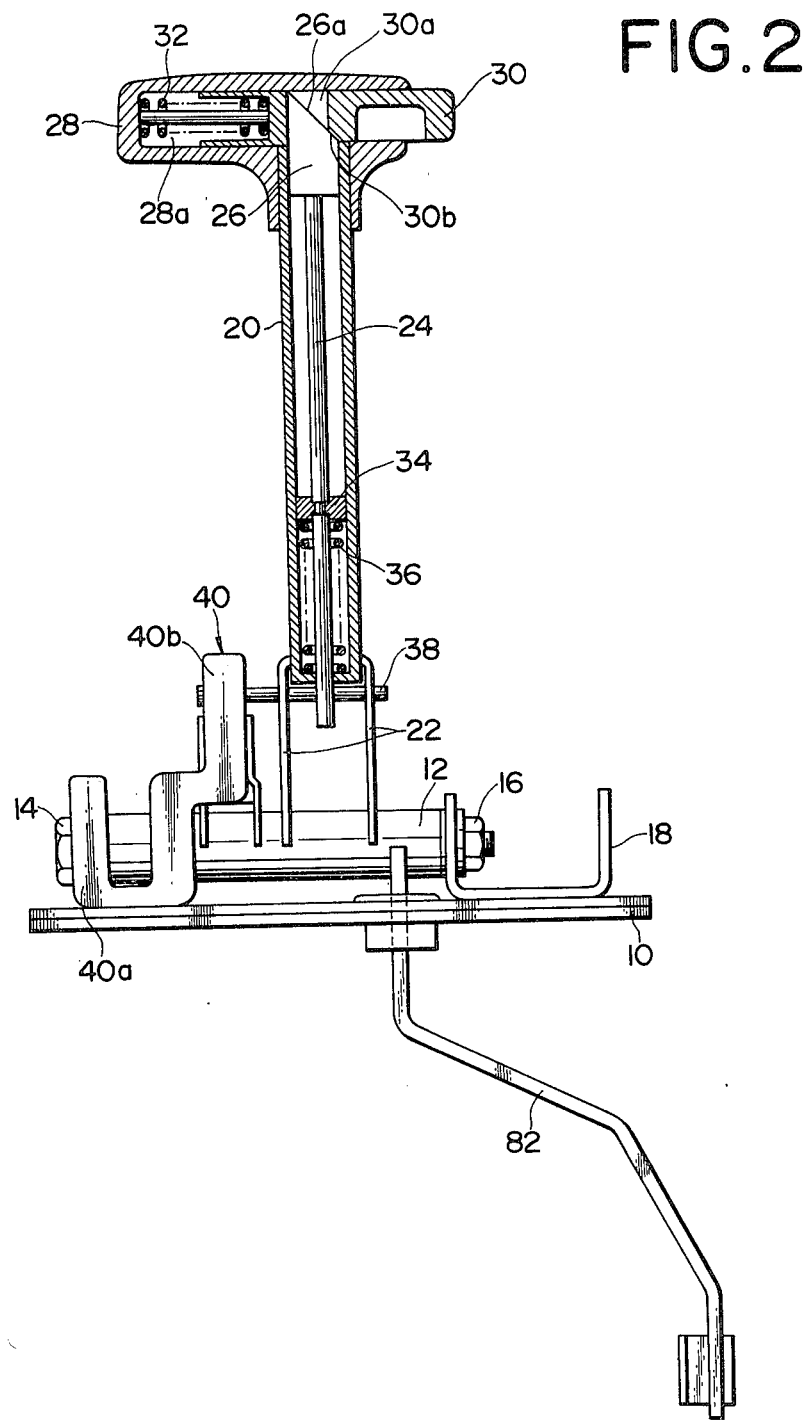
FIG. 2 is a sectional view taken along the line II—II of FIG. 1.
Figure 3:
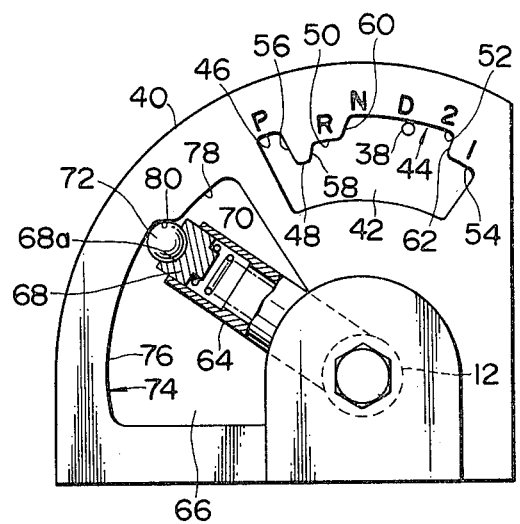
FIG. 3 is a partially sectional enlarged front view of an essential section of the shift lever mechanism of FIG. 1.

Referring to FIGS. 1 to 3, there is shown a first embodiment of the present invention. As is shown in FIGS. 1 and 2, the shift lever mechanism of this embodiment is arranged on a floor 10 of a vehicle body and comprises a cylindrical rod 12 which is rotatably supported by a bolt 14 and a nut 16 by a U-shaped support 18 secured to the floor 10. The cylindrical rod 12 is thus rotatable about its axis relative to the support 18. An elongate tubular member 20 is securely mounted via connecting plates 22 on the cylindrical rod 12 to be swingable with the rod about the rod axis. Within the tubular member 20 is disposed an elongate rod 24 which is axially movable. On the top of the rod 24 is fixed a head member 26 which has an inclined surface 26a. Mounted on the top of the tubular member 20 is a handle 28 which has a blind bore 28a extending perpendicular to the axis of the tubular member 20. A push button 30 is slidably received in the blind bore 28a of the handle 28 and is biased to move in the rightward direction as viewed in FIG. 2 (in the direction to project from the handle 28) by a compression spring 32 disposed between the bottom of the bore 28a and the inside end of the button 30. The push button 30 is formed with a through hole 30a into which the upper section of the head member 26 is movably received. The through hole 30a has a contact surface 30b which engages the inclined surface 26a of the head member 26. The elongate rod 24 has at its intermediate section a spring seat 34 secured thereto. A compression spring 36 is arranged between the spring seat 34 and the lower end of the tubular member 20 to bias the elongate rod 24 in the upward direction. A pin 38 is secured to the lower end of the elongate rod 24 and has an extension placed in an opening 42 formed in a position plate 40 which will hereafter be described in detail.

As is understood from FIG. 2, the position plate 40 is secured at its U-shaped base section 40a to the floor 10 and has a major plate section 40b positioned about the cylindrical rod 12. For cooperation with the extension of the pin 38, the major plate section 40b of the position plate 40 is formed with a generally rectangular opening 42, as is seen from FIG. 1. By the action of the spring 36 which biases the rod 24 and thus the pin 38 upwardly, the extension of the pin 38 is forced to engage an upper edge surface 44 of the opening 42. As is best shown by FIG. 3, the upper edge surface 44 of the opening 42 is formed with a cam portion which has a series of cam surfaces 46, 48, 50, 52 and 54 corresponding to the operational positions of the tubular member 20 (or the shift lever). Each of the cam surfaces is curved to be concentric with the cylindrical rod 12. These cam surfaces are respectively bounded from one another by radially extending step sections 56, 58, 60 and 62. The cam surfaces 46 and 50 are shown to correspond to the parking position (P) and the reverse-drive position (R) respectively. The cam surface 52 corresponds to three positions, which are the neutral position (N), the forward-drive position (D) and the second-speed forward-drive position (2). The cam surface 54 corresponds to the first-speed forward drive position (1). Thus, when the pin 38 is positioned at a selected one of the operational positions P, R, N, D, 2 and 1, the automatic transmission proper assumes the corresponding position.

In accordance with the present invention, there is provided a detent feeling generating mechanism by which the driver or operator can handle the shift lever with a comfortable detent feeling. The feeling generating mechanism, as best shown in FIG. 3, comprises a tubular housing 64 which is secured at its lower end to the cylindrical rod 12 to be swingable with the rod 12 about the rod axis. The tubular housing 64 is arranged to be swingable within a sectorial opening 66 formed in the position plate 40, which opening is located adjacent the before-mentioned generally rectangular opening 42, as shown. A ball seat 68 is slidably received in the tubular housing 64 and is biased to outwardly project from the housing by a compression spring 70 disposed between the ball seat and the bottom of the housing. The ball seat 68 is formed with a spherical recess 68a on which a ball 72 rotatably rests. By the action of the spring 70 in the tubular housing 64, the ball 72 is forced to engage a curved edge surface 74 of the opening 66. It should be noted that the length of the curved edge surface 74 of the opening 66 is determined to correspond to the distance the ball 72 travels when the pin 38 travels from the position "P" to the position "1". As shown, the curved edge surface 74 is formed with two cam surfaces 76 and 78 which are concentric with the cylindrical rod 12. As shown, the distance from the cam surface 76 to the axis of the cylindrical rod 12 is greater than that from the cam surface 78 to the rod axis. These cam surfaces 76 and 78 are bounded by a step section 80. The step section 80 is located at a position where the ball 72 on the ball seat 68 is positioned when the pin 38 assumes the position between "D" and "2". To ensure that the ball 72 rides smoothly up the cam surface 78 from the cam surface 76, the step section 80 is obtusely inclined with respect to each of the cam surfaces 76 and 78. Denoted by numeral 82 (see FIG. 2) is a lever which has one end secured to the cylindrical rod 12 and the other end linked to the automatic transmission proper.

Prior to describing the function provided by the detent feeling generating mechanism, the general operation of the shift lever mechanism will be outlined with reference to FIGS. 1 and 2. For easy understanding, the description will commence with respect to a condition wherein the pin 38 is positioned at "D", as shown in FIG. 1, so that the transmission proper assumes the automatic forward-drive mode. Under this condition, the shift lever can be handled to move the pin 38 toward the position "N" or the position "2" without depressing the push button 30. However, in order to move the shift lever from the position "N" or "2" to either position "R" or "1", moving the shift lever requires the push button 30 to be depressed. As will be understood from FIG. 2, depressing the button 30 causes the downward movement of the elongate rod 24 to separate the pin 38 from the cam surface 52 of the opening 42. Thus, the pin 38 can ride up the cam surface 50 or 54 corresponding to the position "R" or "1", permitting the additional movement of the shift lever. To move the shift lever to the position corresponding to the "P" position of the pin 38, the push button 30 is depressed with stronger force to increase the downward displacement of the rod 24. With this action, the pin 38 is further separated from the cam surface 50, so that it passes over the most projected cam surface 48 and is trapped into the recess, that is the cam surface 46.

Operation of the detent feeling generating mechanism will now be described. For simplicity, the description will commence with respect to the condition wherein the pin 38 is located at the position "D", as shown in FIG. 1. In this condition, the ball 72 engages the cam surface 76 near the step section 80. When the shift lever is handled to move the pin 38 from the position "D" toward the position "2", the ball 72 carried by the tubular housing 64 is forced to ride up the step section 80 and finally rides on the cam surface 78 when pin 38 reaches the position "2". The riding up movement of the ball 72 provides the operator with a slight but comfortable detent feeling transmitted through the shift lever. This feeling gives the operator a feeling of security in shifting the shift lever from the "D" position to the "2" position so that he or she can "feel" that the shift lever is in the "2" position. The travel of the ball 72 along the cam surface 78 increases the force with which the operator handles the shift lever, because the spring 70 is more compressed at this time than when the ball is travelling along the cam surface 76. This phenomenon assists the operator to feel security in shifting. In fact, the force with which the operator handles the shift lever is easily adjusted to a desired value only by changing the spring 70 in the tubular housing 64.

When the shift lever is handled to move the pin 38 from the position "2" toward the position "D", the ball 72 is forced to go down the step section 80 and finally rests on the cam surface 76 when pin 38 reaches at the position "D". The going-down movement of the ball 72 provides the operator with the slight but comfortable detent feeling transmitted through the shift lever, so that he or she can "feel" that the shift lever is in the "D" position.

Figure 4:
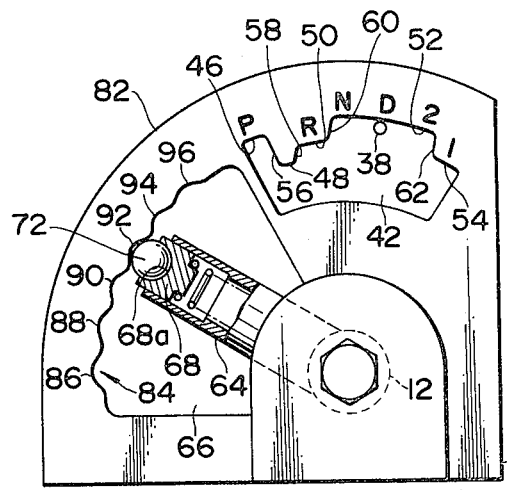
FIG. 4 is a view similar to FIG. 3, showing an essential part of a second embodiment of the present invention.

Referring to FIG. 4, there is shown an essential part of a second embodiment of the present invention, the part shown being substantially the same in construction as that of the above-mentioned first embodiment except for the configuration of the sectorial opening formed in the position plate. Thus, in this drawing, the same parts and construction as those in the first embodiment are designated by the same numerals. In the second embodiment, the curved edge surface 84 concentric with the cylindrical rod 12 is formed with a cam portion which has a series of identical arcuate recesses 86, 88, 90, 92, 94 and 96. These six recesses are formed at positions where the ball 72 is located when the shift lever (and the pin 38) takes the operational positions "P", "R", "N", "D", "2" and "1", respectively. Each recess is formed symmetrically with respect to a normal plane passing through the center of the bottom of the recess and the axis of the rod 12. Thus, a slight but comfortable detent feeling is given to the shift lever operator every time the shift lever is shifted to an adjacent operational position. By the identical configuration of the recesses, the detent feelings produced by them are equally felt by the shift lever operator.

Figure 5:
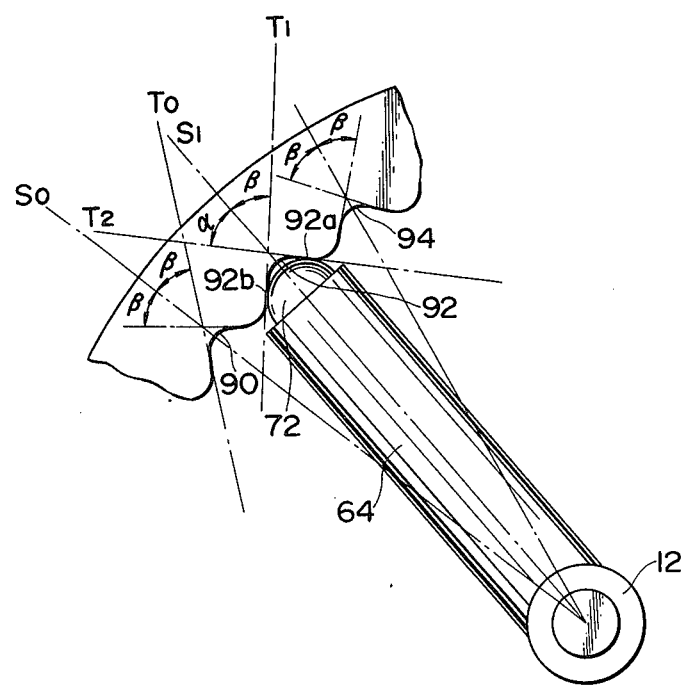
FIG. 5 is an enlarged view showing a modification of a part of the second embodiment.

If desired, the following modification may be applied to the second embodiment of FIG. 4 for giving the shift lever operator a marked detent feeling when shifting from the position "D" (or "2") to the position "2" (or "D"). As will be understood from FIG. 5, the recesses 90, 92 and 94 (the recesses 86, 88 and 96 being omitted from the illustration) are formed identical to each other, in which the intersectional angle defined between a tangent line "$T_0$" tangent to one of the inflections of the curved surface of each recess and a straight line "$S_0$" which passes through both the center of the bottom of the recess and the axis of the cylindrical rod 12 is denoted by "$\beta$". In the configuration of the recess 92, the next-mentioned measure is applied, that is, the intersectional angle defined between a tangent line "$T_1$" tangent to one of the inflections of the curved surface, positioned near the recess 90, and a straight line "$S_1$" which passes through both the center of the bottom of the recess 92 and the axis of the cylindrical rod 12 is "$\beta$", and the intersectional angle (denoted by "$\alpha$") defined between a tangent line "$T_2$" tangent to the other inflection of the curved surface positioned near the recess 94 and the straight line "$S_1$" is smaller than the angle "$\beta$". In other words, the inclination of one side 92a of the curved surface of the recess 92 near the recess 94 is smaller than that of the other side 92b near the recess 90. With this construction, the driver can feel a somewhat greater detent feeling when he or she shifts the shift lever between the "D" and "2" positions, due to the peculiar configuration of the side 92a.

From the foregoing description, it will be appreciated that in the shift lever mechanism according to the present invention, the handling of the shift lever from the "D" position to the "2" position or vice versa provides the operator with an assured and comfortable detent feeling, thereby giving him or her a feeling of security during such shifting. The degree of the detent feeling given to the operator is easily adjusted to a desired different value by changing the ball biasing spring 70 to a different spring.

What is claimed is:

1. A shift lever mechanism for use with a vehicle automatic transmission, comprising:
    first means for selecting one of the operational modes of the automatic transmission;
    second means for retaining the first means in certain ones of its selected operational modes;
    a plate member arranged stationary relative to the vehicle body, said plate member being formed with a stepped cam surface;
    a cylindrical rod swingable about its axis in response to operation of said first means relative to said plate member;
    a tubular housing connected to said cylindrical rod to be swingable therewith about the axis of said cylindrical rod;
    a ball rotatably mounted on the free end of said tubular housing; and
    biasing means for biasing said ball to project from the open end of said tubular housing so that said ball is forced to engage said stepped cam surface of said plate member.

2. A shift lever mechanism as claimed in claim 1, in which said stepped cam surface of said plate member is formed with two cam surfaces which are concentric with said cylindrical rod and are bounded by a step section, said step section being located at a position where said ball is positioned when said first means assumes a position between first and second predetermined transmission mode positions.

3. A shift lever mechanism as claimed in claim 2, in which said first predetermined position of said first means induces the "D" (automatic forward-drive) position of the automatic transmission proper, and said second predetermined position of said first means induces the "2" (second-speed forward-drive) position of said transmission proper.

4. A shift lever mechanism as claimed in claim 1, in which said stepped cam surface of said plate member is concentric with the cylindrical rod and is formed with a series of recesses, said recesses being located at positions where said ball is positioned when said first means takes predetermined positions corresponding to the operational modes of said transmission proper.

5. A shift lever mechanism as claimed in claim 4, in which one of said recesses is constructed different from the other recesses, said recess being located at a position where said ball is positioned when said first means assumes a first predetermined position corresponding to the "D" (automatic forward-drive) position of the transmission proper.

6. A shift lever mechanism as claimed in claim 5, in which a side section of said recess, which is positioned near an adjacent recess with which said ball engages when said first means assumes a second predetermined position corresponding to the "2" (second-speed forward-drive) position of said transmission proper, is inclined less than the other side section of the recess relative to a straight line which passes through both the center of the bottom of said recess and the axis of said cylindrical rod.

7. A shift lever mechanism as claimed in claim 1, in which said first means comprises a tubular member connected at one end to said cylindrical rod to be swingable therewith, and a lever having one end secured to said cylindrical rod and the other end linked to the transmission proper.

8. A shift lever mechanism as claimed in claim 7, in which said second means comprises an elongate rod longitudinally movably received in said tubular member of said first means; biasing means for biasing said rod in a direction; a pin connected to said rod to move therewith; a position plate arranged stationary relative to the vehicle body, said plate having a series of cam surfaces with which said pin engages to be locked; and unlocking means capable of moving said elongate rod in the opposite direction thereby separating said pin from said cam surfaces of said position plate to unlock said pin.

9. A shift lever mechanism as claimed in claim 8, in which said position plate is integral with said plate member.

10. A shift lever mechanism as claimed in claim 8, in which said unlocking means comprises a handle mounted on the top of said tubular member; a push button slidably received in a blind bore formed in said handle; a spring disposed in said blind bore to bias said push button in a direction to project from said blind bore; and a head member mounted on said rod and slidably received in a hole formed in said push button, the connection between said head member and said push button being such that when said push button is pushed against the spring, said head member and thus said elongate rod are moved in the direction to separate said pin secured to said elongate rod from said cam surfaces of said position plate.

* * * * *